(12) United States Patent
Ciccone

(10) Patent No.: US 6,341,788 B1
(45) Date of Patent: Jan. 29, 2002

(54) HAND TRUCK

(76) Inventor: Frank E. Ciccone, 285 Border St., East Boston, MA (US) 02128

( * ) Notice: Subject to any disclaimer, the term of this patent is extended or adjusted under 35 U.S.C. 154(b) by 0 days.

(21) Appl. No.: 09/389,635

(22) Filed: Sep. 3, 1999

(51) Int. Cl.$^7$ .................................................. B62B 3/02
(52) U.S. Cl. ................................. 280/47.28; 280/47.29
(58) Field of Search ........................... 280/47.29, 47.28, 280/47.41, 47.35, 640, 641, 651; 414/11

(56) References Cited

U.S. PATENT DOCUMENTS

| | | | | |
|---|---|---|---|---|
| 614,176 | A | * 11/1898 | Murray | ........................ 280/640 |
| 3,923,167 | A | * 12/1975 | Blackenbeckler | ............ 414/11 |
| 3,968,974 | A | 7/1976 | Wetzel | |
| 4,023,849 | A | * 5/1977 | Bethlen | ........................ 280/640 |
| 4,284,286 | A | 8/1981 | Lewallen | |
| 4,565,382 | A | * 1/1986 | Sherman | ................... 280/47.29 |
| 4,752,173 | A | * 6/1988 | Fleming | ........................ 414/10 |
| 4,919,442 | A | 4/1990 | Green | |
| 5,207,439 | A | * 5/1993 | Mortenson | ................... 280/641 |
| 5,244,221 | A | * 9/1993 | Ward | ........................... 280/79.7 |
| 5,277,439 | A | 1/1994 | Pipes et al. | |
| 5,445,399 | A | 8/1995 | Salvucci, Sr. | |

* cited by examiner

Primary Examiner—Douglas Hess
Assistant Examiner—Elaine Gort

(57) ABSTRACT

A collapsible hand truck for supporting large and heavy objects such as entrance way doors. The hand truck being able to adjust to varying load center of gravities, thereby allowing a single individual to handle extremely heavy loads. A tiltable main frame which can rotate about a fulcrum point allowing even the heaviest loads to be shifted from a vertical to a horizontal plane with minimal effort by the individual. The main frame is supported by a pair of struts and the length of the frame is adjustable to compensate for doors of various lengths and center of gravities. A front strut having a pair of loading wheels and a rear strut having auxiliary caster wheels for maneuverability. The struts being rotative to each other.

9 Claims, 5 Drawing Sheets

HAND TRUCK

BACKGROUND OF THE INVENTION

1. Field of the Invention

The present invention relates generally to a hand-propelled truck for carrying relatively large and heavy objects such as doors, and more particularly to a hand truck capable of adapting to the center of gravity of the object.

2. Description of the Prior Art

Hand trucks or dollies have been used for many years to move a variety of heavy objects. Normally, the hand truck is used by one person. It is typically designed having a lip or nose section for supporting the load, a frame for resting the load, a handle, a pair of wheels located at the bottom of the frame and occasionally a smaller pair of caster wheels for support and manuevering of the load. Braking systems are well known and they serve to lock the wheels in place when tilting the hand truck rearwards to the horizontal position.

The present invention provides a hand truck with an improved means for adjusting to a shift in the center of gravity of the load. This is essential for enabling a single person to handle a very heavy load.

Some prior art patents teach improved hand trucks having means for achieving some of the above objects. For instance U.S. Pat. No. 5,277,439 issued to George R. Pipes et al. on Jan. 11, 1994, depicts a hand truck that uses a pair of auxiliary wheels that swing away from the main frame, thereby allowing the load to be tilted backwards to a generally horizontal and stable position. The load rests on all four wheels and shows a much improved method over other prior patents. This invention requires the operator to control the movement of the main frame by a pull member whereas in the present invention no such mechanism is needed.

U.S. Pat. No. 4,919,442 issued to Thomas F. Green on Apr. 24, 1990, teaches the use of a leverage method for shifting the weights of the object to be carried. This patent basically forms a cart but not a hand truck that can be utilized as a work bench as well.

U.S. Pat. No. 5,445,399 issued to Frank S. Salvucci, Sr. on Aug. 29, 1995, shows a collapsable hand truck having a positive leg locking arrangement for a retractable leg. It utilizes a slide means for tilting the load. This invention does not seek to teach the ability of the hand truck to swing away from the main frame to form a horizontal work bench as does the present invention.

U.S. Pat. No. 3,968,974 issued to Nelson Wetzel on Jul. 13, 1976, teaches the use of a hand truck with an elaborate braking system. The present invention uses a very simple braking means.

U.S. Pat. No. 4,284,286 issued to Charles D. Lewallen on Aug. 18, 1987, describes a hand truck that utilizes auxiliary castor wheels to form a work table from a conventional hand truck. The present invention also forms a work bench, however it is the actual load (door) that provides the bench surface.

It is appreciated that the prior art addresses the need to more efficiently handle long or heavy objects with a simple hand truck. Some hand trucks have devices which secure the object to the truck and others have means for making adjustments for a changing center of gravity. It is evident that the hand truck of the present invention may be improved upon to a significant degree, and it is to this end, that this invention as shown and described herein is directed.

SUMMARY OF THE INVENTION

The invention is a self-propelled hand truck that utilizes the center of gravity of the load itself to assist a single operator in handling loads upwards of 400 pounds or more with a minimum of effort. The most pressing need that the invention addresses is in transporting doors that are often bulky and extremely heavy. It is recognized that the invention will perform equally as well transporting other loads, but for this specification the load will be assumed to be a door. The invention utilizes the weight of the load pivoting about a fulcrum point.

The invention includes a relatively rectangular main frame, upon which the door is placed. A pair of rectangularly shaped strut members support the main frame and the load thereupon. A pair of main wheels are attached to the forward strut for the purpose that wheels serve and a pair of auxiliary wheels (caster) are attached to the rear strut member for support and manueverability. A fulcrum assembly connects the frame to the struts. The frame and both struts can be extended in length to compensate for variations in lengths of the doors handled. The truck is relatively lightweight and manufactured from common materials, such as steel or aluminum. The strut and frame members are made from metal stock having a tubular and flat shape respectively.

Accordingly, it is a principal object of this invention to provide a hand truck that can be adjusted to the center of gravity of the load carried, thereby allowing the operator to utilize the weight of the load to assist him in handling it.

It is another object to provide a hand truck that will form a work bench whereby immediate repairs can be made.

It is a further object to provide a hand truck that is manufactured from the minimum number of parts and relatively inexpensive parts.

It is still another object of the invention to provide a hand truck that is capable of turning 360 degrees in its own tracks for manueverability.

And yet another object of the invention is to provide a hand truck for removing rather heavy and large doors, wherein the length and thickness of the door is not a factor.

It is another object of the invention to provide a hand truck that is collapsible for ease in moving and storage.

It is still another object of the invention to have the frame and support struts be capable of extension for handling extremely long doors.

And finally it is an object of the invention to provide a hand truck that will exhibit a high level of stability regardless of whether the load is vertical, tilted or horizontal to the ground surface.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
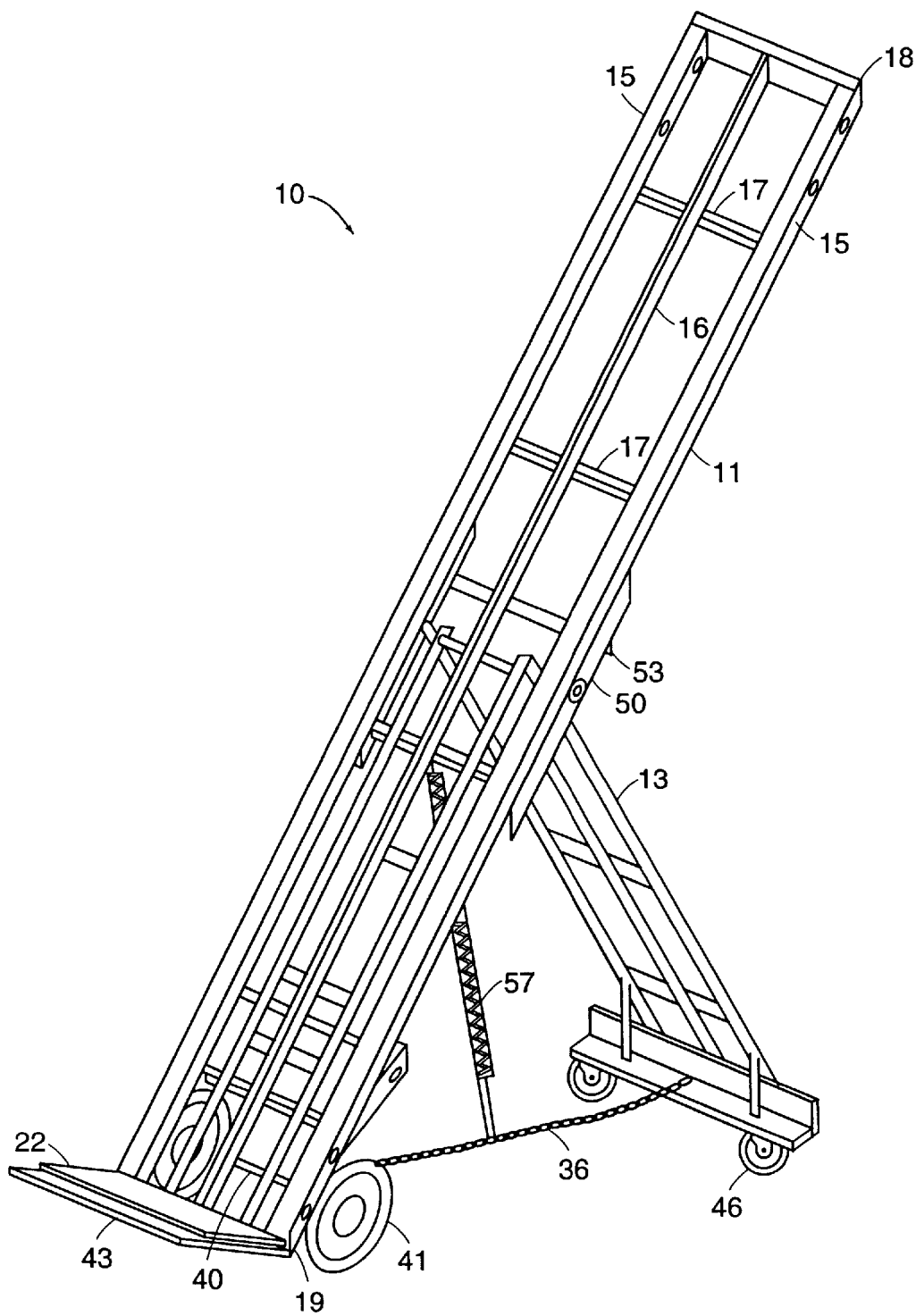
FIG. 1 is a pictorial view of the frame.

Referring to the drawings, the invention provides for a hand truck 10 for loading and manuevering large and heavy objects such as doors. These doors are usually of the large type, found at the entrances of private and public buildings. FIGS. 1–4 show the hand truck 10 comprising of a support frame 11, a front strut member 12, a rear strut member 13 and a fulcrum assembly for connecting all of them together in a cooperating relationship to each other. These features will be discussed in detail below.

Support frame 11 is a relatively open rectangular lattice structure having a pair of elongated rectangularly shaped side beams 15 and a center beam 16 parallel to the side beams 15, all integral with each other by means of braces 17 perpendicularly spaced relative to the beams 15, 16. The connection of braces 17 to beams 15, 16 being by conventional means such as welding. Frame 11 having a top end 18, a bottom end 19, a top surface and a bottom surface 21. Integral with the bottom end 19 a lip 22 extends outwardly from the top surface 20. The lip 22 receives door members and other objects to be transported, as is well known and understood. In order to make the frame 11 adjustable for tall doors, both side beams 15 are capable of being extended. Telescopic extension beams 23 are located at both ends 18, 19 and they can be manually extended outward to a plurality of selectable positions. The side beams 15 have apertures 24 whereby retaining pegs 25 can be inserted through a number of selectable openings in the extensions 23. A pair of locking bars 26 each having a circular opening 27 therein, are each mounted to the bottom end 19 of one of the side beams. When desired, the frame 11 can be secured to the front strut member 12 by passing a locking rod 28 through the two openings 27. Eyelets 29 are mounted on the bottom surface 21 at top and bottom ends 18 and 19 of the center beam 16. This will be discussed in greater detail further on in this disclosure. For purposes of clarity of the illustration, the elements which help to secure the lip 22 to the frame 11 have been omitted.

Figure 3:
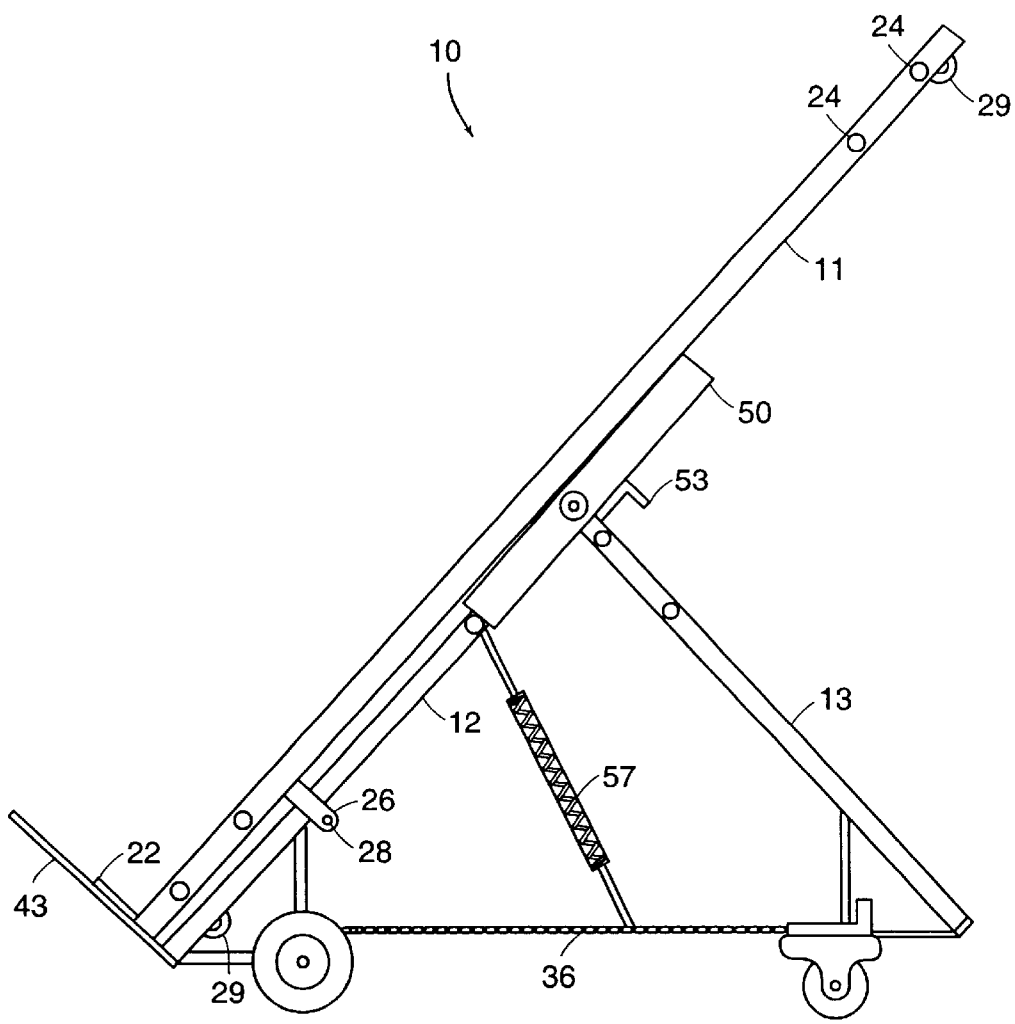
FIG. 3 is a side elevational view of the hand truck in a tilted position.
Figure 4:
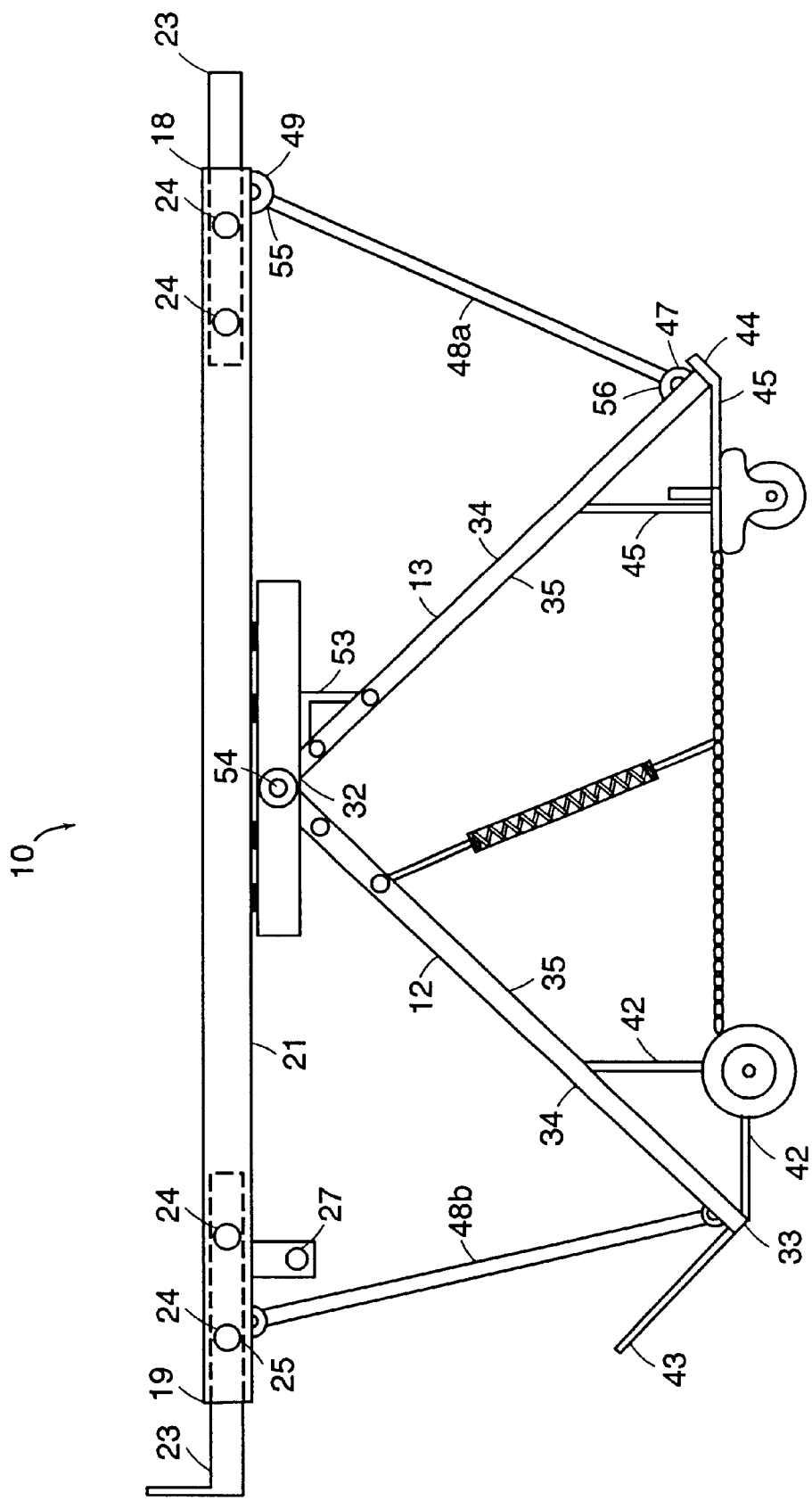
FIG. 4 is a side elevational view of the hand truck when the main frame is in a horizontal position relative to the ground.
Figure 5:
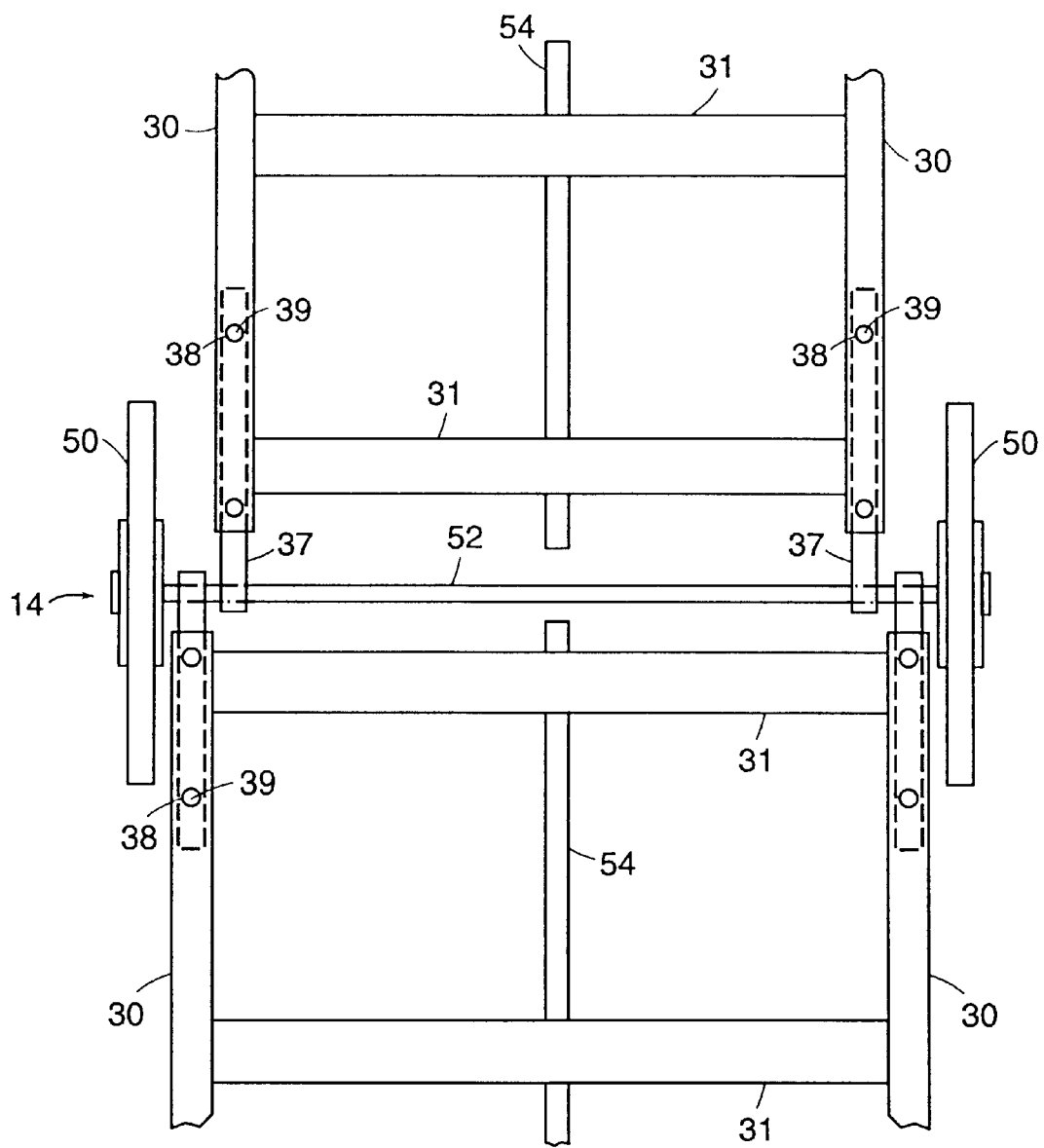
FIG. 5 is a top view of the strut members being connected to each other by a fulcrum assembly.

FIGS. 1, 3 and 5 describe the open lattice type strut members 12 and 13, each having a pair of elongate tubular shaped legs 30 connected by conventional means to cross-sarms 31. Arms 31 are made from relatively flat metal stock and are arranged perpendicularly to legs 30. A middle strap 54 parallel to and equidistantly spaced within the legs 30 provides additional structural strength of the struts 12, 13. Each strut member 12, 13 having an upper end 32 and a lower end 33. Each strut member 12, 13 having an exterior side 34 and an interior side 35. Front strut member 12 including an axle 40 connected to the interior side 35 of its lower end 33, wherein a pair of main wheels 41 for moving hand truck 10 and load are mounted on each distal end of the axle 40. Extending radially outward from the axle 40, and appropriately journaled thereto for rotation, is a front bracket 42 which is stabilized by connection to the lower end 33 of the interior side 35 of the front strut member 12. A protruding platform 43, for supporting an article (door) to be moved, extends outwardly from the lower exterior side 26 of the front strut 12. In addition to supporting the lip 21, the platform 43 allows the user to slide under the desired load (door). The rear strut member 13 has a support bar 44 at the lower end 33 for integrally connecting the tubular legs 30 to each other. A rear bracket 45 has an upper portion connecting it to the interior side 35 of the rear strut 13 and a lower portion containing a pair of auxiliary wheels 46, which allow the hand truck 10 360 of rotational manueverability. A chain 36 links together the two strut members 12, 13 to maintain a workable height relative to the load. A tension spring assembly 57 interconnects between the front strut member 12 and the chain 36 for controlling the amount of slack in the chain 36 at various positions of the hand truck 10. The tension spring 57 is made up of inexpensive metal spring coil, having sufficient tension strength to support the weight of the chain 36. The strut members 12, 13 are joined together at their upper ends 32 in a pivotable relationship to each other by the fulcrum assembly 14, thereby allowing the members 12 and 13 to freely rotate with respect to each other. The chain 36 limits the spread of the struts from each other. When extremely elongated loads are encountered, the tubular legs 30 are extendable to cooperatively respond to the frame 11 which is extended. Each upper leg 30 can be telescopically extended by extension legs 37. Slotted openings 38 located at the upper ends of the legs 30 allow for retention pegs 39 to contain the extension to the desired length.

Figure 2:
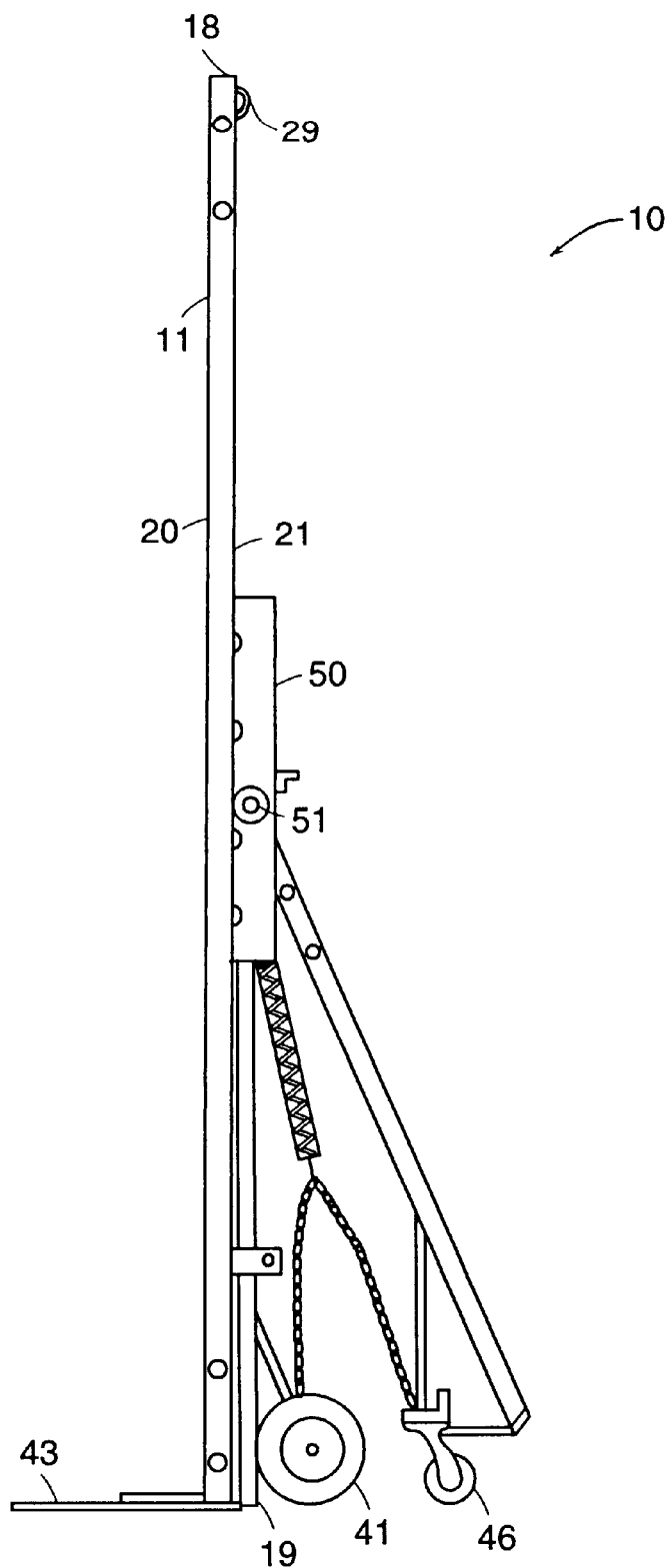
FIG. 2 is a side elevational view of the hand truck in a relatively vertical position.

As shown in FIG. 5, the means for connecting the frame 11 and the struts 12, 13 is a fulcrum assembly 14 having a pair of elongated rectangular shaped frame bars 50. Each frame bar connected on one longitudinal side to the bottom surface 21, approximately at the middle point of each of side beam 15 by conventional fastening means such as welding. Each bar 50 having a hole 51 therein, the hole 51 located at approximately the center of the bar 50. A fulcrum pin 52 passes through the holes 51 and also through the slotted openings 38 in the upper ends of the legs 37 of the strut members 12 and 13. Conventional retaining means of the pin 52 are employed at both ends. It is this fulcrum pin 52 that allows the strut members 12, 13 to rotate in relation to each other, and it also allows the main frame 11 to pivot from a vertical position as shown in FIG. 2 to the slanted position as shown on FIG. 3 and finally the horizontal position as described by FIG. 4. A stop bar 53 extends from the lower portion of each frame bar 50 across and beneath the bottom surface 21 of the frame 11. This stop bar 53 insures that the frame 11, when pivoted into the horizontal work bench position, will not pivot rearwardly beyond the horizontal plane. When in the horizontal plane the individual can prop support poles 48a and 48b, both having eyelet connectors at their distal ends 55, to be connected by means of support pegs 49 to eyelets 29 located on the center beam 16 of frame 11. The proximal ends 56 of the support poles 48a and 48b have rotational members 47 connecting to the lower portions of the rear and front strut members 13 and 12 respectively.

It is necessary, that when the frame 11 is being put into the rearward position, that the main wheels 29 be in a locked position. The brake system employed by the invention uses a conventional system, whereby a spring released coil causes a bar to be biased against the main wheels 41. A hand control lever, mounted on the interior surface 35 of the front strut member 12 can be activated thereby causing the spring to be tensioned and thus pulling the bar away from the wheels so that the brake will be released. The braking system used herein is similar to those brake systems found in most hand trucks, therefore for the sake of clarity the brake system used herein is not shown in the drawings.

The present invention is an improved hand truck that allows a single individual to handle exremely heavy loads. The frame 11 of the basic hand truck 10 is approximately 6'10" which is the height of an average door. For doors of greater height, the operator merely adjusts the the length of the frame 11 and struts 12, 13 to accommodate them to the height of the door being moved. In tilting the door rearwards, little physical effort is required regardless of the weight of the door. The weight of the door pivoting about the fulcrum 14 provides most of the necessary momentum. The essential inventive concept is to utilize the center of gravity of the door (load) as it pivots about the fulcrum point. As long as the center of gravity of the door is approximately at the fulcrum point, the weight of the top portion of the door moving downwardly and rearwardly is compensated by the weight of the bottom of the door moving in an upward direction. The stop bar 53 insures that the frame 11 will not pivot beyond the horizontal plane. The individual merely has to manuever the hand truck so that the lip of the truck can slide under the door to be moved. The individual tilts the door rearwardly 30° to 45° in order to handle it efficiently. Often it is desirable to make repairs to the door right at the jobsite. This is facilitated by the present invention having the capability to be put into a horizontal plane and thus be used as a work bench. The support poles 48a and 48b are positionable with the corresponding eyelets 29 of the main frame 11 to provide an extra measure of stability when the frame and door are in this plane.

It is to be understood that the present invention is not limited to the sole embodiment described above, but encompasses any and all embodiments within the scope of the following claims.

I claim:

1. A door handling hand truck comprising:
   (a) an elongate substantially rectangular pivotable support frame having a top end and a bottom end, a top surface and a bottom surface, a lip extruding outwardly from the bottom end;
   (b) a pair of elongate side beams having multiple apertures at both the top and bottom ends;
   (c) an elongate center beam parallel and equidistantly interposed between the side beams;
   (d) a plurality of braces positioned perpendicularly to the beams for connecting the beams into a unitary frame structure;
   (e) adjustable extension beams telescopically slidable from both ends of the side beams, multiple apertures defined in the beams, whereby the frame can extend to varying lengths thereby accommodating doors having varying center of gravities;
   (f) removable retaining pegs insertable in the apertures for maintaining the beams at varying lengths;
   (g) a pair of locking bars, each having a circular opening therein, each locking bar mounted to the bottom surface of each side beam at a position nearer to the bottom end;
   (h) a pair of adjustable strut members, a front strut member and a rear strut member, each substantially rectangular and rotatively connected to each other at their upper ends;
   (i) a pair of main wheels having means for attaching to the front strut member for moving the hand truck;
   (j) a pair of auxiliary wheels having means for attaching to the rear strut member for providing support and 360 degree rotation;
   (k) a fulcrum assembly having means for connecting the frame and struts to each other, the frame being pivotable about the assembly from a vertical plane to a horizontal plane, the strut members rotative about the assembly, whereby the center of gravity of a door being handled is pivotable about the assembly;
   (l) a chain extending between the strut members for restricting the distance of travel therebetween;
   (m) a locking rod passing through the circular openings, for securing the bottom surface of the frame to the front strut member; and
   (n) a pair of eyelets mounted on the bottom surface of the top and bottom ends of the center beam, for receiving means connecting the rear and front strut members to the frame when the frame is in the horizontal plane, whereby a door being removed from a doorway onto the hand truck will be caused to pivot between vertical and horizontal planes while allowing the weight of the top portion of the door to be in equilibrium with the weight of the bottom portion of the door about the fulcrum point.

2. The hand truck according to claim 1, wherein the front and rear struts each comprise:
   a pair of adjustable elongate tubular legs;
   a middle strap parallel with and interposed between the legs;
   a plurality of crossarms connecting the legs and strap together to form the strut member;
   a lower end, an exterior side and an interior side;
   extension legs telescopically extending outwardly from the upper end of each tubular leg to form strut members of varying lengths for adjusting to the varying lengths of the frame;
   a plurality of slotted openings defined in the extension legs and the tubular legs; and
   a plurality of extension pegs insertable in the adjustable slotted openings for retaining the extension legs within the tubular legs.

3. The hand truck according to claim 2, wherein the wheel attaching means comprises:
   an axle connected to the interior side of the lower end of the front strut member;
   a front bracket extending radially outward from the axle and appropriately journaled thereto for rotation; and
   the main wheels each being mounted on an opposing end of the axle for moving the hand truck.

4. The hand truck according to claim 3, wherein the front strut member includes a protruding platform extending outwardly from the lower exterior side for supporting the door.

5. The hand truck according to claim 4, wherein the auxiliary wheel fastening means includes:
   a support bar connected to the lower end of the interior side of the rear strut; and
   a rear bracket having an upper portion connecting to the interior side of one of the crossarms and a lower portion supporting the auxiliary wheels.

6. The hand truck according to claim 5, wherein the means for connecting the rear and front strut members to the eyelets of the frame comprises:
   support poles having proximal ends rotatively connected to the lower portions of the strut members and distal ends connected to the eyelets of the frame; and
   support pegs for securing the strut members to the frame when the frame is placed in the horizontal plane,
   whereby the frame and door loaded thereupon can be utilized as a work bench.

7. The hand truck according to claim 6, wherein the frame and strut connecting means of the fulcrum assembly comprises:
   a pair of frame bars, each integral with the bottom surface of one of the side beams;
   a hole defined in approximately the middle of each frame bar;
   a fulcrum pin extending through the hole in each frame bars for pivotally retaining the frame therein; and
   the pin further transversing through the top slotted openings of each strut member, whereby the strut members are connected in a rotative relationship to each other.

8. A hand truck according to claim 7, wherein the fulcrum assembly includes a stop bar integral with the bottom portion of the frame bars and extending between the frame bars, whereby the stop bar will directly contact the exterior side when the frame is in the horizontal plane, thereby preventing the frame from being able to tilt rearwardly beyond the horizontal plane.

9. A hand truck comprising:

(a) an elongate pivotable rectangular support frame having an open lattice type construction comprising a pair of side beams, a center beam parallel and equidistantly interposed between the side beams, a plurality of perpendicularly positioned braces connecting the beams together, a top end, a bottom end, a lip extruding outwardly from the top surface of the bottom end, adjustable extension beams telescopically extending from both ends of the side beams for extending the length of the frame, multiple apertures in the side beams and in the extension beams, retaining pegs insertable in the apertures for maintaining the frame at various lengths, a pair of locking bars, each having a circular opening therein, each locking bar mounted to the bottom surface of each side beam nearer to the bottom end, a locking rod for passing through the circular openings, eyelets mounted on the bottom surface of the top and bottom ends of the center beam;

(b) a pair of rotative elongate substantially rectangular strut members, a front strut member, a rear strut member, each strut member having a pair of elongate tubular legs, a middle strap interposed between and substantially parallel to the legs, a plurality of cross arms connecting the legs and strap together, each strut member having an upper end, lower end, an exterior side and an interior side, extension legs telescopically extending outwardly form the upper end of each tubular leg to form struts of varying lengths, a plurality of slotted openings defined in the extension legs and tubular legs, a plurality of extension legs insertable in the adjustable slotted openings to retain the extension legs in position, each strut member having a support pole having a proximal end rotatively connected to the lower portion of the strut member and a distal end rotatively connected to the corresponding eyelet of the support frame, support pegs for securing strut members to the frame;

(c) the front strut member having an axle connected to the lower end of its interior side, a front bracket extending radially outward from the axle and appropriately journaled thereto for rotation, a pair of main wheels each mounted on an opposing end of the axle for moving the truck, a protruding platform extending outwardly from the lower exterior side;

(d) a fulcrum assembly having a pair of frame bars, each connected to the bottom surface of one of the side beams, a hole defined in each frame bar, a fulcrum pin extending through the frame bars to pivotally retain the frame, the pin further extending through the top slotted openings in each strut member to connect each in a rotative relationship to each other, whereby the support frame can pivot about from a vertical to a horizontal plane, the assembly having a stop bar integral with the lower portion of the frame bars extending between therein, whereby upon the frame being pivoted into the horizontal plane, the stop bar will contact the rear strut to prevent the frame from being tilted rearwardly beyond the horizontal plane;

(e) a chain extending between the lower ends of the front and rear strut members to restrict the distance of travel therebetween; and (f) a tension spring assembly interconnecting between the front strut member and the chain for controlling the slack in the chain when the hand truck is in various positions, whereby when the length of the frame and struts are adjusted to accommodate doors of varying sizes, the center of gravity of the doors will be maintained about the fulcrum point.

\* \* \* \* \*